(12) United States Patent
Okada

(10) Patent No.: US 8,116,607 B2
(45) Date of Patent: Feb. 14, 2012

(54) RARE-EARTH DOPED OPTICAL FIBER, METHOD OF PRODUCING THE SAME, AND FIBER LASER

(75) Inventor: Kenji Okada, Sakura (JP)

(73) Assignee: Fujikura Ltd., Tokyo (JP)

( * ) Notice: Subject to any disclaimer, the term of this patent is extended or adjusted under 35 U.S.C. 154(b) by 425 days.

(21) Appl. No.: 12/403,961

(22) Filed: Mar. 13, 2009

(65) Prior Publication Data

US 2009/0238216 A1 Sep. 24, 2009

(30) Foreign Application Priority Data

Mar. 13, 2008 (JP) ................. 2008-064715

(51) Int. Cl.
*G02B 6/036* (2006.01)
*H01S 3/00* (2006.01)

(52) U.S. Cl. ..................... 385/127; 359/341.3

(58) Field of Classification Search ............... 359/341.3
See application file for complete search history.

(56) References Cited

FOREIGN PATENT DOCUMENTS

| JP | 07-109144 A | 4/1995 |
|---|---|---|
| JP | 09-235130 A | 9/1997 |
| JP | 11-26843 A | 1/1999 |
| JP | 11-278862 A | 10/1999 |
| JP | 2002-526373 A | 8/2002 |
| JP | 2004-137110 A | 5/2004 |

OTHER PUBLICATIONS

T. Kitabayashi et al., "Population Inversion Factor Dependence of Photodarkening of Yb-doped Fibers and its Suppression by Highly Aluminum Doping", OThC5, 2006, Anaheim, USA.

*Primary Examiner* — Omar Rojas
(74) *Attorney, Agent, or Firm* — Sughrue Mion, PLLC

(57) ABSTRACT

A rare-earth doped optical fiber that includes a core and one or more clad layers surrounding the core, in which the core has a rare earth dopant, and a relationship of Equation (1) is satisfied:

$$0 < \frac{\int_{r_0}^{r_c} D(r) \cdot P_p^2(r) \cdot P_s^2(r) r \, dr}{\int_{r_0}^{r_c} D(r) \cdot P_p^2(r) r \, dr} \leq 0.35 \quad (1)$$

where $P_p(r)$ represents an electric field distribution in an exciting wavelength, $P_s(r)$ represents an electric field distribution in wavelengths of spontaneous emission and/or stimulated emission carried in the core, $D(r)$ (mass %) represents a rare-earth dopant distribution, $r_o$ represents a core center, and $r_c$ represents a core radius.

13 Claims, 4 Drawing Sheets

RARE-EARTH DOPED OPTICAL FIBER, METHOD OF PRODUCING THE SAME, AND FIBER LASER

CROSS-REFERENCE TO RELATED APPLICATION

This application claims priority from Japanese Patent Application No. 2008-064715, filed Mar. 13, 2008 in the Japanese Patent Office, the disclosure of which is incorporated herein by reference in its entirety.

BACKGROUND OF THE INVENTION

1. Field of the Invention

Apparatuses and methods consistent with the present invention relate to a rare-earth doped optical fiber.

2. Description of the Related Art (I) A rare-earth doped double-clad optical fiber has been proposed wherein the optical fiber includes: an optical fiber core (i.e., a rare-earth doped core) of silica glass doped with a rare-earth element, such as erbium (Er) or ytterbium (Yb); a first clad surrounding the core, to which a pumping beam for efficient excitation of the rare-earth element is injected; and a second clad provided on the first clad to form an outermost layer, the second clad consisting of a low-refractive-index polymer resin having a refractive index lower than that of the first clad (for example, refer to Japanese Unexamined Patent Application, First Publication No. H 11-26843).

In a rare-earth doped double-clad optical fiber in which a first clad has a large-diameter, a first clad-to-core coupling of a pump beam can be used. Accordingly, regarding the rare-earth doped double-clad optical fiber, it is known that a high-energy beam can be injected, and the injected high-energy beam can be used to efficiently excite rare-earth ions as compared to rare-earth doped single-clad optical fibers. The rare-earth doped single-clad optical fibers have no second clad, and it is necessary to inject the pumping beams directly to the core thereof.

(II) Regarding a rare-earth dopant distribution of the rare-earth doped core (along a radial direction of the optical fiber), the excitation efficiency of the single-clad rare-earth doped optical fiber depends on an overlap integral of the power distribution in the propagation light of the pumping beam and the rare-earth dopant distribution. In order to increase an overlapping area to improve the excitation efficiency, for example, it has been proposed to dope the rare earth uniformly along the radial direction, or dope the rare earth in a distribution in agreement with the power distribution in the propagation light (for example, refer to: Japanese Unexamined Patent Application, First Publication No. 2004-137110; Japanese Unexamined Patent Application, First Publication No. H 11-278862; Japanese Unexamined Patent Application, First Publication No. H 09-235130; and Japanese Unexamined Patent Application, First Publication No. H 07-109144).

(III) Improvement of the excitation efficiency requires increased rare-earth doping. It is known, however, that high-concentration doping of the rare earth may cause aggregation of the doped rare earth ions at the doping site and form a cluster (a phenomenon known as "clustering"). The clustering is generally known to cause photodarkening, which is a phenomenon of increasing propagation loss of the optical fiber due to high excitation power incident on the optical fiber (see T. Kitabayashi, et al, "Population Inversion Factor Dependence of Photodarkening of Yb-doped Fibers and its Suppression by Highly Aluminum Doping", OFC 2006, Anaheim, USA, paper OThC5, 2006).

To control the occurrence of the photodarkening, a method of producing a rare-earth doped optical fiber has been proposed in which high-concentration doping of aluminum is conducted or a direct nanoparticle deposition (hereinafter, DND) is conducted in order to control occurrence of clustering (for example, refer to Published Japanese Translation No. 2002-526373 of the PCT International Publication).

As in the related art (II), when the rare earth dopant distribution is in agreement with the power distribution of the excitation light or when the high-concentration rare-earth dopant is uniformly dispersed in the radial direction of the fiber, the high-concentration rare earth is doped to a high excitation power portion. In this case, clustering tends to be caused depending on the rare earth concentration distribution. Accordingly, the photodarkening may occur depending on the clustering, which may increase the optical fiber loss. As a result, the transmission loss in spontaneous emission and/or stimulated emission may increase, which may cause a decrease in the power output.

The DND process of the related art (III) requires advanced manufacturing technology since the DND process requires a technique wherein nano-sized liquid-phase droplets are sprayed onto a flame. It is thus difficult to maintain manufacturing stability. The DND process of the related art (III) is not preferred from the viewpoint of manufacturing cost.

Furthermore, since aluminum may increase the refractive index, it is difficult to apply multi-component glass particles having high-concentration aluminum doped thereto and an optical amplifier fiber using the same, which are disclosed in Published Japanese Translation No. 2002-526373 of the PCT International Publication in which the DND process is employed, to a core with a low relative index difference Δ ("low Δ core").

SUMMARY OF THE INVENTION

The invention has been made in view of the aforementioned circumstances and an exemplary object thereof is to provide a low optical loss and high oscillation efficiency rare-earth doped optical fiber with a controlled rare-earth dopant distribution that reduces a photodarkening effect.

According to an aspect of the present invention, there is provided a rare-earth doped optical fiber that includes a core and one or more clad layers surrounding the core, in which the core has a rare earth dopant, and the relationship in the Equation (1) is satisfied:

$$0 < \frac{\int_{r_0}^{r_c} D(r) \cdot P_p^2(r) \cdot P_s^2(r) r\, dr}{\int_{r_0}^{r_c} D(r) \cdot P_p^2(r) r\, dr} \leq 0.35 \quad (1)$$

where $P_p(r)$ represents an electric field distribution in an exciting wavelength, $P_s(r)$ represents an electric field distribution in wavelengths of spontaneous emission and/or stimulated emission carried in the core, $D(r)$ (mass %) represents a rare-earth dopant distribution, $r_o$ represents a core center, and $r_c$ represents a core radius.

The rare-earth doped optical fiber may further include two or more clad layers, and the relationship in the following Equation (2) is satisfied:

$$0 < \frac{\int_{r_0}^{r_c} D(r) \cdot P_s^2(r) r \, dr}{\int_{r_0}^{r_c} D(r) r \, dr} \leq 0.35 \quad (2)$$

A rare-earth dopant distribution of an outer peripheral portion of the core may have a higher concentration than a rare-earth dopant distribution of the core center.

The rare-earth dopant may include at least ytterbium.

According to another aspect of the invention, there is provided a method of producing the rare-earth doped optical fiber described above. The method includes doping the rare earth dopant to a porous glass preform through at least one of vapor-phase doping and solution doping; sintering the preform to form a core preform; producing at least one clad layer in an outside vapor deposition process or a jacketing process around the core preform; and drawing the obtained optical fiber preform.

According to yet another aspect of the invention, a fiber laser is provided that can include the rare-earth doped optical fiber described above as an optical amplification medium. The invention can produce the aforementioned fiber laser.

The present invention further provides methods for producing a rare-earth doped optical fiber of the present invention.

The present invention provides a method of producing a rare-earth doped optical fiber comprising a core and one or more clad layers surrounding the core, the method comprising:

determining a refractive index profile of the optical fiber;

calculating an electric field distribution $P_p(r)$ in an exciting wavelength and an electric field distribution $P_s(r)$ in wavelengths of spontaneous emission and/or stimulated emission carried in the core, based on the refractive index profile;

determining a rare-earth dopant distribution D(r) such that a relationship of Equation (1) is satisfied:

$$0 < \frac{\int_{r_0}^{r_c} D(r) \cdot P_p^2(r) \cdot P_s^2(r) r \, dr}{\int_{r_0}^{r_c} D(r) \cdot P_p^2(r) r \, dr} \leq 0.35 \quad (1)$$

producing a preform of the optical fiber to have the refractive index profile and the rare-earth dopant distribution D(r); and drawing the preform to provide a rare-earth doped optical fiber strand, wherein $r_o$ represents a core center and $r_c$ represents a core radius.

The present invention provides a method of producing a rare-earth doped optical fiber comprising a core and two or more clad layers surrounding the core, the method comprising:

determining a refractive index profile of the optical fiber;

calculating an electric field distribution $P_s(r)$ in wavelengths of spontaneous emission and/or stimulated emission carried in the core, based on the refractive index profile;

determining a rare-earth dopant distribution D(r) such that a relationship of Equation (2) is satisfied:

$$0 < \frac{\int_{r_0}^{r_c} D(r) \cdot P_s^2(r) r \, dr}{\int_{r_0}^{r_c} D(r) r \, dr} \leq 0.35 \quad (2)$$

producing a preform, on which a clad layer is formed, of the optical fiber to have the refractive index profile and the rare-earth dopant distribution D(r);

drawing the perform; and depositing at least one resin on the perform to provide a rare-earth doped optical fiber strand which has two or more clad layers, wherein $r_o$ represents a core center and $r_c$ represents a core radius.

BRIEF DESCRIPTION OF THE DRAWINGS

The above and other aspects of the invention will become more apparent by describing in detail exemplary embodiments thereof with reference to the attached drawings, in which.

DETAILED DESCRIPTION OF EXEMPLARY EMBODIMENTS OF THE INVENTION

Figure 1:
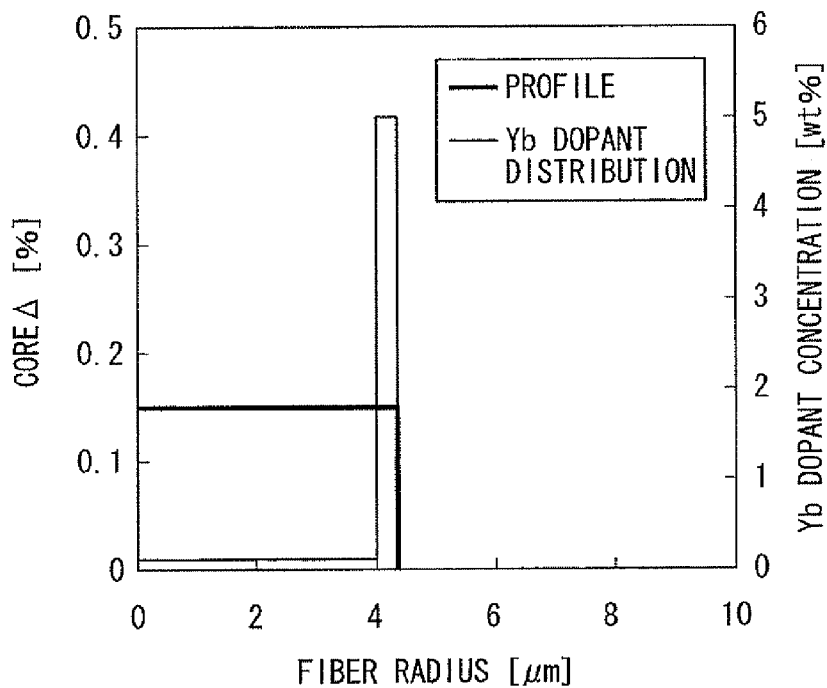
FIG. 1 is a graph of a refractive index profile and an Yb dopant distribution of a rare-earth doped double-clad fiber produced in Example 1.

Exemplary embodiments of the invention relate to a rare-earth doped optical fiber. In particular, exemplary embodiments of the invention relate to a rare-earth doped optical fiber having a rare-earth dopant distribution and a refractive index profile that reduce photodarkening, which is a phenomenon of increasing loss and occurs in an optical fiber after high-excitation power is injected. The rare-earth doped optical fiber according to exemplary embodiments of the invention can be suitably used for fiber lasers, fiber amplifiers and the like.

The rare-earth doped optical fiber according to exemplary embodiments of the invention has an optimized rare-earth dopant distribution in the core in order to solve the problem described above. In particular, the rare-earth dopant distribution of the core is adjusted such that the relationship of following Equation (1) below is satisfied, where the electric field distribution in (wavelengths of) spontaneous emission and/or stimulated emission carried in the core is $P_s(r)$ (which has been normalized with the peak value 1), the electric field distribution in the exciting wavelength is $P_p(r)$ (which has been normalized with the peak value 1), and the rare-earth dopant distribution is D(r) (mass %).

$$0 < \frac{\int_{r_0}^{r_c} D(r) \cdot P_p^2(r) \cdot P_s^2(r) r \, dr}{\int_{r_0}^{r_c} D(r) \cdot P_p^2(r) r \, dr} \leq 0.35 \quad (1)$$

The denominator of Equation (1) is a term that relates to the excitation distribution of the rare-earth element and/or photo darkening. The numerator of Equation (1) is a term that relates to the loss of the oscillation light, and the loss is influenced by the photodarkening effect. In Equation (1), $r_o$ represents a core center and $r_c$ represents a core radius.

The rare-earth dopant distribution that satisfies Equation (1) can provide improved oscillation efficiency even if the photodarkening occurs, since there are small overlapping areas of the electric field distribution in the oscillation wavelength and a loss distribution (i.e., a photodarkening distribution) of the oscillation light. If the solution of Equation (1) is 0, however, there is no overlapping area of the rare-earth dopant distribution and the oscillation wavelength, which disadvantageously causes no stimulated-emission. Similarly, if the solution of Equation (1) is larger than 0.35, the loss of the oscillation light becomes disadvantageously large, and is therefore unsuitable for the present invention.

A rare-earth doped double-clad optical fiber has a structure that preferably satisfies Equation (1). In the rare-earth doped double-clad optical fiber structure, the electric field distribution $P_p(r)$ in the excitation (i.e., pumping) light wavelength incident into the first clad is a multi-mode distribution, and almost uniform irradiation is thus conducted along the radial direction of the core (i.e., the electric field distribution $P_p(r)=1$), which hardly causes the excitation efficiency to decrease. In this rare-earth doped double-clad optical fiber, Equation (1) can be written as Equation (2).

$$0 < \frac{\int_{r_0}^{r_c} D(r) \cdot P_s^2(r) r \, dr}{\int_{r_0}^{r_c} D(r) r \, dr} \leq 0.35 \quad (2)$$

It is only required to consider the rare-earth dopant distribution D(r) in order to satisfy Equation (2). The overlapping area of the electric field distribution in the oscillation wavelength and the loss distribution (i.e., the photodarkening distribution) by which the oscillation light is influenced can easily be made small. The solution of Equation (2) should also be larger than 0 as described above.

In order to produce the rare-earth doped optical fiber according to exemplary embodiments of the invention that satisfies the relationship in Equation (1) and/or (2), the rare-earth element may be doped through a vapor-phase doping process or a solution doping process. In the vapor-phase doping process, the rare-earth element is doped in a vapor phase. In the solution doping, a porous glass (i.e., glass soot) is first fabricated, and then the glass is immersed in a solution to which the rare-earth element has been doped. The method of doping is not limited by the aforementioned methods, and any method may be used for the present invention. The glass soot may be fabricated by any method, including vapor-phase axial deposition (VAD), outside vapor deposition (OVD), chemical vapor deposition (CVD) and the DND. These are common processes in production of the optical fibers, and thus may advantageously maintain the manufacturing stability and reduce the cost. Any material may be used for forming the optical fiber of the present invention as needed. The optical fiber may be made of any known material.

The rare-earth doped optical fiber according to exemplary embodiments of the invention is significantly less influenced by the photodarkening. It is thus not necessary to dope excessively high-concentration aluminum, and control of the refractive index is advantageously easy.

Next, an exemplary method of designing the rare-earth doped optical fiber and a preform that satisfy the relationship of Equation (1) and/or (2) will be described.

(a) A refractive index profile that may provide a desired optical property is first calculated. The refractive index profile may be determined by any method. In exemplary embodiments of the invention, the refractive index profile of the rare-earth doped optical fiber is not particularly limited, and may be a stepped profile or a depressed profile. It is important, however, that the optical fiber is excited in a single mode at the oscillation wavelength. Even in multimode oscillation, it is possible to adopt a method in which the rare-earth doped optical fiber is bent to cause the higher mode to attenuate by bending loss in order to provide single-mode excitation.

(b) The electric field distribution in an absorption wavelength and an oscillation wavelength obtained by the desired refractive index profile is calculated.

(c) The rare-earth dopant distribution is designed such that the ratio of the overlap integral of the obtained electric field distribution and the rare-earth dopant distribution satisfies Equation (1) or (2).

(d) A preform of the rare-earth doped optical fiber is produced to have the refractive index profile obtained in (a) and the rare-earth dopant distribution obtained in (c). The preform is then drawn to provide a rare-earth doped optical fiber strand. The obtained optical fiber strand is evaluated.

Figure 7:
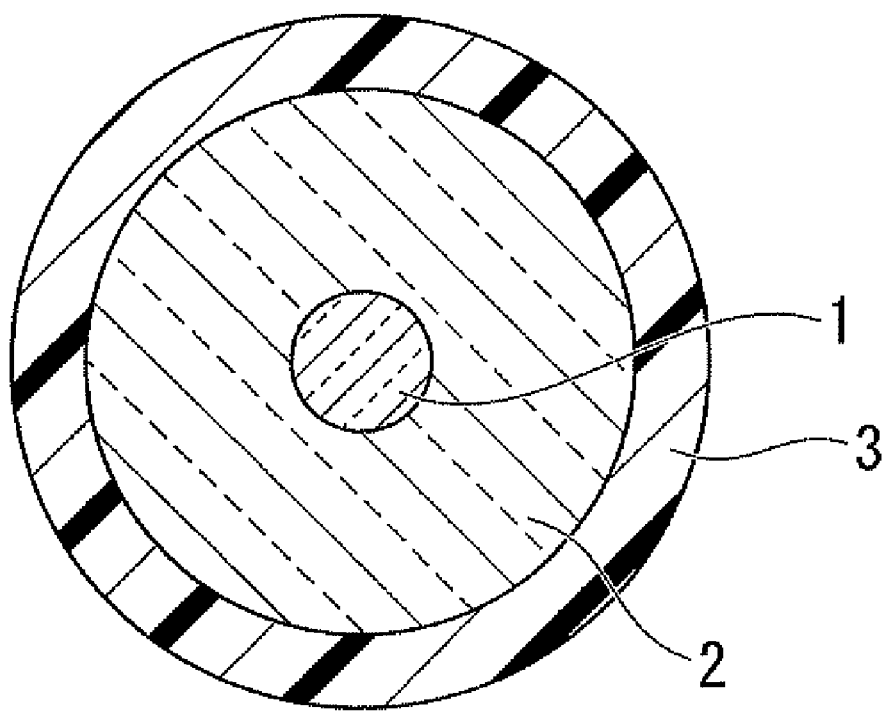
FIG. 7 is a schematic sectional view which shows an example of a rare-earth doped double-clad fiber of an exemplary embodiment of the present invention.

The core according to exemplary embodiments of the invention may be pure silica glass with the rare-earth dopant and the first clad is preferably, but not limited to, pure silica glass without the rare-earth dopant. The diameter and cross sectional shape of the clad and the core may be suitably selected. An example of the rare-earth doped double-clad fiber of exemplary embodiments of the present invention, wherein a first clad 2 surrounds a core 1 and the second clad layer 2 surrounds the first clad 2, is shown in FIG. 7. The first clad 2 is a silica clad, and the second clad is a polymer clad.

The general optical fibers of the related art that have been produced without the processes (b) to (d) do not have the preferable rare-earth dopant distribution in the core thereof. Accordingly, as compared to exemplary embodiments of the invention, the related art optical fibers do not provide advantageous effects.

The rare-earth dopant distribution of the rare-earth doped optical fiber of exemplary embodiments of the invention is controlled to be in the range defined by Equation (1) and/or (2). In this manner, the photodarkening, which is a phenomenon of increasing optical loss of the optical fiber due to high excitation power incident on the optical fiber, can be prevented, and thus the loss of the oscillation light can be reduced.

Accordingly, it is possible to improve the oscillation efficiency.

Exemplar embodiments of the invention have multiple clad layers to cause the multimode excitation light to be propagated in the clad. In this manner, the excitation efficiency can be kept high and the rare-earth dopant distribution can be flexibly designed. Furthermore, the loss of the oscillation light can also be reduced.

EXAMPLES

Hereinafter, exemplary optical fibers and methods of producing the same according to exemplary embodiments of the invention will be described. The invention, however, is not limited to those described and may be changed without departing from the technical idea thereof.

A preform of the rare-earth doped optical fiber is produced in accordance with the aforementioned preform design process. The preform is then drawn to provide a rare-earth doped optical fiber (i.e., the rare-earth doped double-clad fiber herein) and is evaluated.

Example 1

An optical fiber core preform according to the design shown in FIG. 1 is obtained in the following manner. A glass soot is formed by depositing in a modified chemical vapor deposition (MCVD) process, and then aluminum (Al) and ytterbium (Yb) are doped to the glass soot in a solution doping process according to the design shown in FIG. 1. The doped glass soot is subject to sintering and collapse processes to prepare a core preform. Then a clad is formed on a surface of the core preform in a jacketing process. In this manner, an optical fiber preform (having a core $\Delta$ of 0.15% and a core radius of 4.4 µm) that has the refractive index profile and the Yb dopant distribution shown in FIG. 1 is obtained.

The preform is then drawn in a drawing device. Low-refractive-index polymer resin is deposited to cover the optical fiber preform to provide a rare-earth doped double-clad fiber.

The core $\Delta$ (i.e., the difference in relative refractive index between the core and the first clad) is provided by aluminum (Al) doped to the core.

Since the optical fiber of Example 1 is a rare-earth doped double-clad fiber, a value calculated by Equation (2) is 0.31 by using characteristics obtained in the design process.

Excitation light of 980 nm wavelength is made to enter the first clad of the obtained fiber and light of 1060 nm wavelength is made to enter the core as the optical signal. The oscillation efficiency is high and there is almost no power loss, which would have otherwise been caused by the photodarkening.

Example 2

Figure 2:
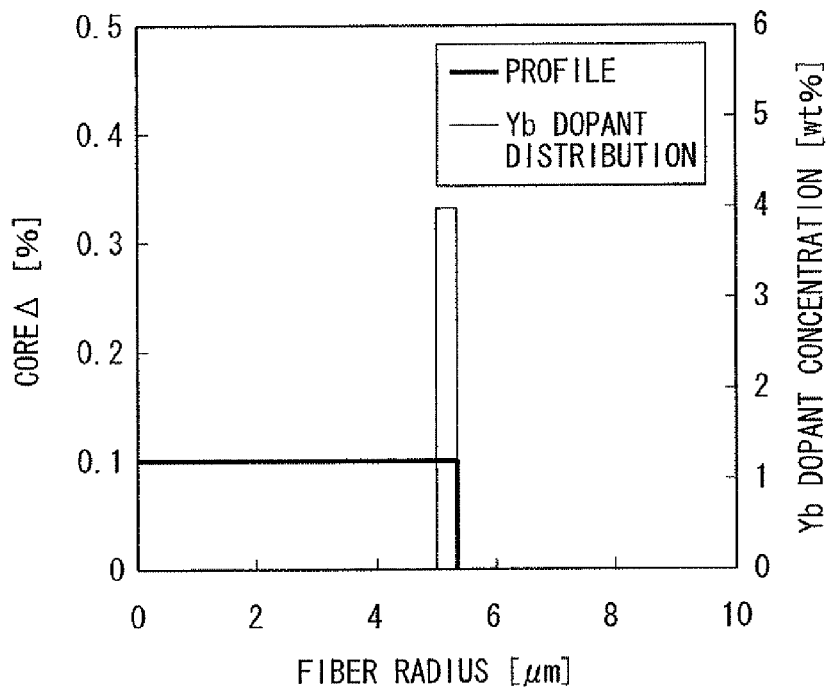
FIG. 2 is a graph of a refractive index profile and an Yb dopant distribution of a rare-earth doped double-clad fiber produced in Example 2.

An optical fiber core preform according to the design shown in FIG. 2 is obtained in the following manner. A glass soot is formed by depositing in a VAD process, and then aluminum (Al) and ytterbium (Yb) are doped to the glass soot in a solution doping process according to the design shown in FIG. 2. The obtained glass soot is subject to a sintering process to prepare a core preform. Then a clad is formed on a surface of the core preform in an outside vapor deposition process. In this manner, an optical fiber preform (having a core $\Delta$ of 0.10% and a core radius of 5.4 µm) that has the refractive index profile and the Yb dopant distribution shown in FIG. 2 is obtained.

The preform is then drawn in a drawing device. Low-refractive-index polymer resin is deposited to cover the optical fiber preform to provide a rare-earth doped double-clad fiber.

The core $\Delta$ is provided by aluminum (Al) and germanium (Ge) doped to the core.

A value calculated by Equation (2) is 0.27 by using characteristics obtained in the design process.

Excitation light of 980 nm wavelength is made to enter the first clad of the obtained fiber and light of 1060 nm wavelength is made to enter the core as the optical signal. The oscillation efficiency is high and there is almost no power loss, which would have otherwise been caused by the photodarkening.

Example 3

Figure 3:
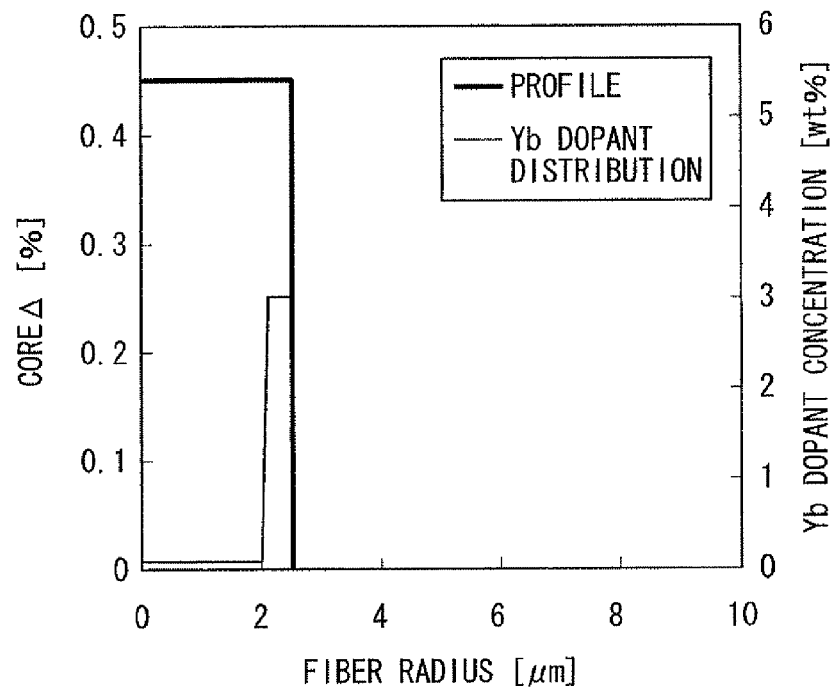
FIG. 3 is a graph of a refractive index profile and an Yb dopant distribution of a rare-earth doped double-clad fiber produced in Example 3.

An optical fiber core preform according to the design shown in FIG. 3 is obtained in the following manner. A glass soot is formed by depositing in a plasma chemical vapor deposition (PCVD) process, and then aluminum (Al) and ytterbium (Yb) are doped to the glass soot in a solution doping process according to the design shown in FIG. 3. The obtained glass soot is subject to a sintering process to prepare a core preform. A clad is formed on a surface of the core preform in an outside vapor deposition process. In this manner, an optical fiber preform (having a core $\Delta$ of 0.45% and a core radius of 2.5 µm) that has the refractive index profile and the Yb dopant distribution shown in FIG. 3 is obtained.

The preform is then drawn in a drawing device. Low-refractive-index polymer resin is deposited to cover the optical fiber preform to provide a rare-earth doped double-clad fiber.

The core $\Delta$ is provided by aluminum (Al), germanium (Ge), and fluoride (F) doped to the core.

A value calculated by Equation (2) is 0.34 by using characteristics obtained in the design process.

Excitation light of 980 nm wavelength is made to enter the first clad of the obtained fiber and light of 1060 nm wavelength is made to enter the core as the optical signal. The oscillation efficiency is high and there is almost no power loss that would have otherwise been caused by the photodarkening.

Comparative Example 1

Figure 4:
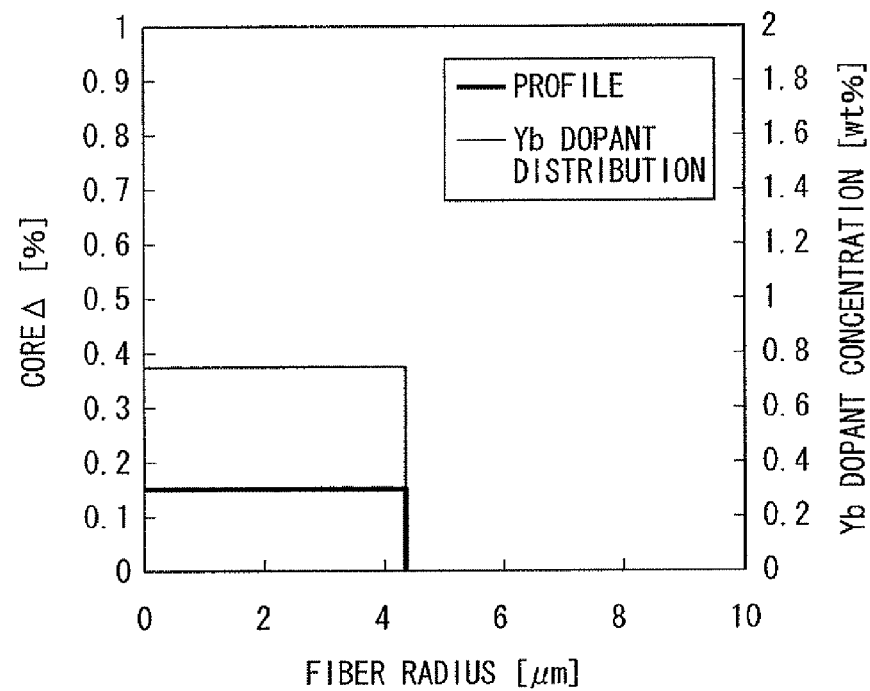
FIG. 4 is a graph of a refractive index profile and an Yb dopant distribution of a rare-earth doped double-clad fiber produced in Comparative Example 1.

An optical fiber core preform according to the design shown in FIG. 4 is obtained in the following manner. A glass soot is formed by deposition in a MCVD process, and then aluminum (Al) and ytterbium (Yb) are doped to the glass soot in a solution doping process according to the design shown in FIG. 4. The obtained glass soot is subject to sintering and collapse processes to prepare a core preform. A clad is formed on a surface of the core preform in a jacketing process. In this manner, an optical fiber preform (having a core $\Delta$ of 0.15% and a core radius of 4.4 µm) that has the refractive index profile shown in FIG. 4 is obtained.

The preform is then drawn in a drawing device. Low-refractive-index polymer resin is deposited to cover the optical fiber preform to provide a rare-earth doped double-clad fiber.

The core $\Delta$ is provided by aluminum (Al) doped to the core.

A value calculated by Equation (2) is 0.56 by using characteristics obtained in the design process.

Excitation light of 980 nm wavelength is made to enter the first clad of the obtained fiber and light of 1060 nm wavelength is made to enter the core as the optical signal. A significant power loss that is caused by the photodarkening is observed.

Comparative Example 2

Figure 5:
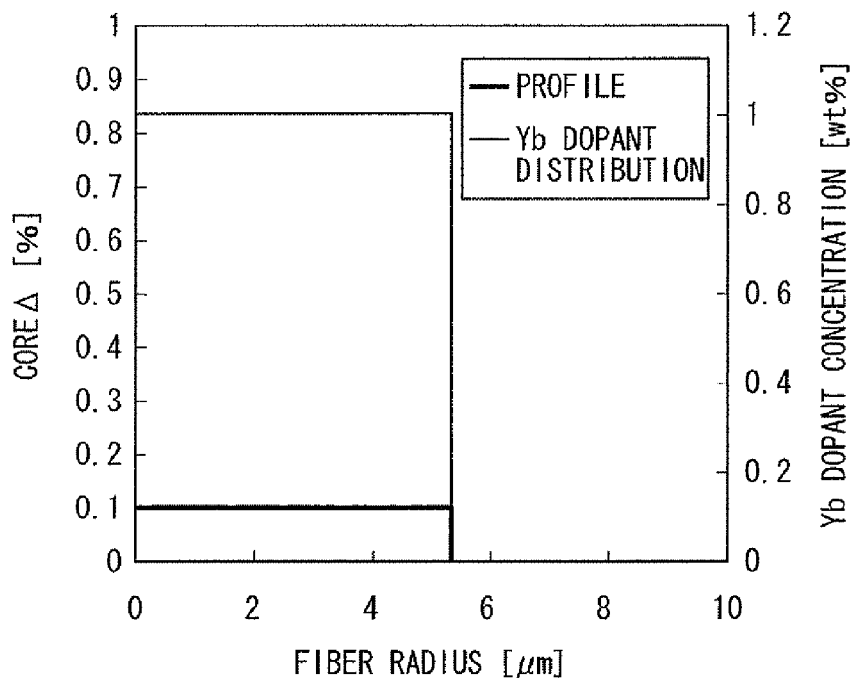
FIG. 5 is a graph of a refractive index profile and an Yb dopant distribution of a rare-earth doped double-clad fiber produced in Comparative Example 2.

An optical fiber core preform according to the design shown in FIG. 5 is obtained in the following manner. A glass soot is formed by deposition in a VAD process, and then aluminum (Al) and ytterbium (Yb) are doped to the glass soot in a solution doping process according to the design shown in FIG. 5. The obtained optical fiber core preform is subject to a sintering process. A clad is formed on a surface of the core preform in an outside vapor deposition process to prepare a core preform. In this manner, an optical fiber preform (having a core Δ of 0.10% and a core radius of 5.4 μm) that has the refractive index profile shown in FIG. 5 is obtained.

The preform is then drawn in a drawing device. Low-refractive-index polymer resin is deposited to cover the optical fiber preform to provide a rare-earth doped double-clad fiber.

The core Δ is provided by aluminum (Al) and germanium (Ge) doped to the core.

A value calculated by Equation (2) is 0.56 by using characteristics obtained in the design process.

Excitation light of 980 nm wavelength is made to enter the first clad of the obtained fiber and light of 1060 nm wavelength is made to enter the core as the optical signal. A significant power loss that is caused by the photodarkening is observed.

Comparative Example 3

Figure 6:
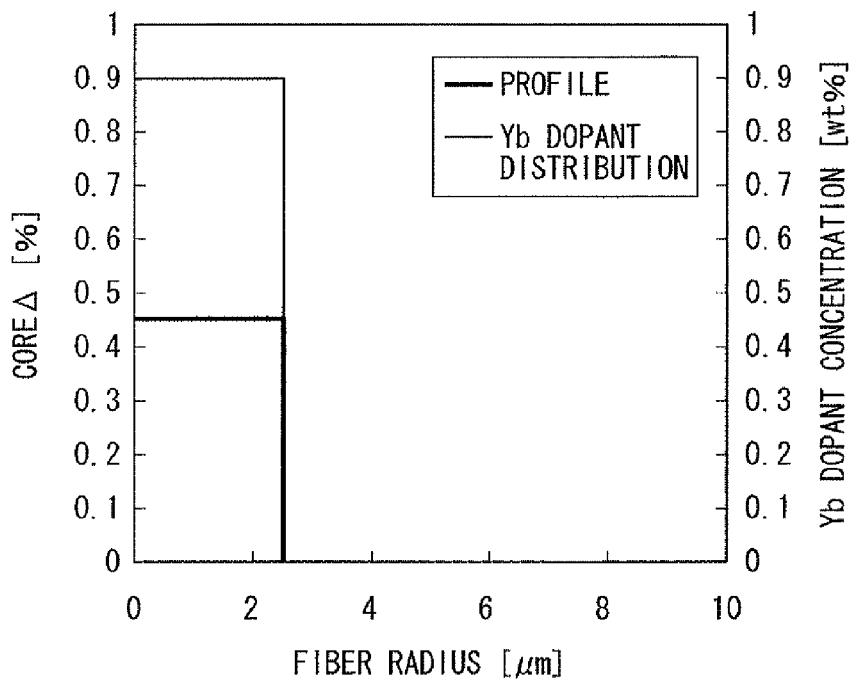
FIG. 6 is a graph of a refractive index profile and an Yb dopant distribution of a rare-earth doped double-clad fiber produced in Comparative Example 3.

An optical fiber core preform according to the design shown in FIG. 6 is obtained in the following manner. A glass soot is formed by depositing in a PCVD process, and then aluminum (Al) and ytterbium (Yb) are doped to the glass soot in a solution doping process according to the design shown in FIG. 6. The obtained glass soot is subject to a sintering process to prepare a core preform. A clad is formed on a surface of the core preform in an outside vapor deposition process. In this manner, an optical fiber preform (having a core Δ of 0.45% and a core radius of 2.5 μm) that has the refractive index profile shown in FIG. 6 is obtained.

The preform is then drawn in a drawing device. Low-refractive-index polymer resin is deposited to cover the optical fiber preform to provide a rare-earth doped double-clad fiber.

The core Δ is provided by aluminum (Al), germanium (Ge) and fluoride (F) doped to the core. A value calculated by Equation (2) is 0.55 by using characteristics obtained in the design process.

Excitation light of 980 nm wavelength is made to enter the first clad of the obtained fiber and light of 1060 nm wavelength is made to enter the core as the optical signal. A significant power loss that is caused by the photodarkening is observed.

As described above, according to exemplary embodiments of the invention, a low optical loss, high oscillation efficiency, and high performance rare-earth doped optical fiber with a controlled rare-earth dopant distribution that reduces a photodarkening effect is obtained.

While exemplary embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims and their legal equivalents.

What is claimed is:

1. A rare-earth doped optical fiber comprising a core and one or more clad layers surrounding the core, wherein the core comprises a rare earth dopant, and a relationship of Equation (1) is satisfied:

$$0 < \frac{\int_{r_0}^{r_c} D(r) \cdot P_p^2(r) \cdot P_s^2(r) r \, dr}{\int_{r_0}^{r_c} D(r) \cdot P_p^2(r) r \, dr} \leq 0.35 \quad (1)$$

where $P_p(r)$ represents an electric field distribution in an exciting wavelength, $P_s(r)$ represents an electric field distribution in wavelengths of spontaneous emission and/or stimulated emission carried in the core, $D(r)$ (mass %) represents a rare-earth dopant distribution, $r_o$ represents a core center, and $r_c$ represents a core radius.

2. The rare-earth doped optical fiber according to claim 1, comprising two or more clad layers, wherein a relationship of Equation (2) is satisfied:

$$0 < \frac{\int_{r_0}^{r_c} D(r) \cdot P_s^2(r) r \, dr}{\int_{r_0}^{r_c} D(r) r \, dr} \leq 0.35 \quad (2)$$

3. The rare-earth doped optical fiber according to claim 1, wherein a rare-earth dopant distribution of an outer peripheral portion of the core has a higher concentration than a rare-earth dopant distribution of the core center.

4. The rare-earth doped optical fiber according to claim 1, wherein the rare earth dopant comprises ytterbium.

5. A method of producing the rare-earth doped optical fiber of claim 1, the method comprising:
   doping the rare earth dopant to a porous glass preform through at least one of vapor-phase doping and solution doping;
   sintering the preform to form a core preform;
   producing at least one clad layer in an outside vapor deposition process or a jacketing process around the core preform; and
   drawing the obtained optical fiber preform.

6. A fiber laser comprising the rare-earth doped optical fiber of claim 1 as an optical amplification medium.

7. The rare-earth doped optical fiber according to claim 2, wherein the rare earth dopant comprises ytterbium.

8. A method of producing the rare-earth doped optical fiber of claim 2, the method comprising:
   doping the rare earth dopant to a porous glass preform through at least one of vapor-phase doping and solution doping;
   sintering the preform to form a core preform;
   producing at least one clad layer in an outside vapor deposition process or a jacketing process around the core preform; and
   drawing the obtained optical fiber preform.

9. A fiber laser comprising the rare-earth doped optical fiber according to claim 2 as an optical amplification medium.

10. A method of producing a rare-earth doped optical fiber comprising a core and one or more clad layers surrounding the core, the method comprising:
   determining a refractive index profile of the optical fiber;
   calculating an electric field distribution $P_p(r)$ in an exciting wavelength and an electric field distribution $P_s(r)$ in wavelengths of spontaneous emission and/or stimulated emission carried in the core, based on the refractive index profile;
   determining a rare-earth dopant distribution D(r) such that a relationship of Equation (1) is satisfied:

$$0 < \frac{\int_{r_0}^{r_c} D(r) \cdot P_p^2(r) \cdot P_s^2(r) r \, dr}{\int_{r_0}^{r_c} D(r) \cdot P_p^2(r) r \, dr} \leq 0.35 \quad (1)$$

producing a preform of the optical fiber to have the refractive index profile and the rare-earth dopant distribution D(r); and drawing the preform to provide a rare-earth doped optical fiber strand, wherein $r_o$ represents a core center and $r_c$ represents a core radius.

11. A method of producing a rare-earth doped optical fiber comprising a core and two or more clad layers surrounding the core, the method comprising:

determining a refractive index profile of the optical fiber;

calculating an electric field distribution $P_s(r)$ in wavelengths of spontaneous emission and/or stimulated emission carried in the core, based on the refractive index profile;

determining a rare-earth dopant distribution D(r) such that a relationship of Equation (2) is satisfied:

$$0 < \frac{\int_{r_0}^{r_c} D(r) \cdot P_s^2(r) r \, dr}{\int_{r_0}^{r_c} D(r) r \, dr} \leq 0.35 \quad (2)$$

producing a perform, on which a clad layer is formed, of the optical fiber to have the refractive index profile and the rare-earth dopant distribution D(r);

drawing the perform; and depositing at least one resin on the perform to provide a rare-earth doped optical fiber strand which has two or more clad layers, wherein $r_o$ represents a core center and $r_c$ represents a core radius.

12. The rare-earth doped optical fiber according to claim 2, wherein the rare-earth doped optical fiber is a rare-earth doped double-clad optical fiber.

13. The method of producing a rare-earth doped optical fiber according to claim 11, wherein the rare-earth doped optical fiber is a rare-earth doped double-clad optical fiber.

* * * * *